United States Patent

Bissex

[11] Patent Number: 5,348,435
[45] Date of Patent: Sep. 20, 1994

[54] BIN UNLOADING APPARATUS
[75] Inventor: Karl A. Bissex, Plainfield, Vt.
[73] Assignee: DMS, Inc., Barre, Vt.
[21] Appl. No.: 726,919
[22] Filed: Jul. 8, 1991
[51] Int. Cl.[5] .................................................. B65G 3/04
[52] U.S. Cl. ................................. 414/310; 414/306; 414/326
[58] Field of Search ........ 414/150, 158, 213, 306–312, 414/319, 320, 325, 326, 503, 523, 526, 140.7, 141.9, 142.1, 142.2, 177, 179, 187, 189–190, 194, 197, 211, 314–318, 327, 395–396, 304, 305, 313, 321; 198/550.1, 550.2

[56] References Cited

U.S. PATENT DOCUMENTS

| | | | |
|---|---|---|---|
| 3,212,652 | 10/1965 | Roberts . | |
| 3,650,418 | 3/1972 | Dissmeyer et al. | 414/306 |
| 3,908,839 | 9/1975 | Menaut | 414/310 |
| 4,099,633 | 7/1978 | Cantenot | 414/309 |
| 4,146,144 | 3/1979 | Johansson | 414/313 X |
| 4,350,467 | 9/1982 | Soros | 414/313 X |
| 4,437,806 | 3/1984 | Olson | 414/307 |
| 4,717,308 | 1/1988 | Kuhns | 414/307 |

FOREIGN PATENT DOCUMENTS

| | | | |
|---|---|---|---|
| 0346284 | 12/1921 | Fed. Rep. of Germany | 414/395 |
| 2463085 | 3/1981 | France | 414/309 |
| 2611681 | 9/1988 | France . | |
| 60-213631 | 10/1985 | Japan . | |
| 0064927 | 3/1989 | Japan | 414/140.7 |
| 0272140 | 5/1970 | U.S.S.R. | 414/395 |
| 0645514 | 6/1979 | U.S.S.R. | 414/319 |
| 8402112 | 6/1984 | World Int. Prop. O. | 414/142.2 |

Primary Examiner—Michael S. Huppert
Assistant Examiner—James Keenan
Attorney, Agent, or Firm—Antonelli, Terry, Stout & Kraus

[57] ABSTRACT

A bin unloading apparatus for unloading materials such as, for example, sawdust, peat, grains, silage, municipal waste, dry chemicals, shredded tires, and other ground bulk products accommodated in a bin, with the bin unloader including two cantilevered tapered screw conveyors and a single standard screw. The screw conveyors draw materials from the walls of the bin toward the center. The materials drop to the exit screw mounted at a right angle to the screw conveyor with the material in the exit screw then being transported out of the bin. The screw conveyors are supported on a head assembly mounted on a support beam of rail using a cam follower bearing and a chain drive system provides a reciprocating motion of the head assembly utilizing a ratchet mechanism driven by a drive of the exit screw. The screw conveyors are attached to the head assembly by a flange attachment and a spring loaded arm or linkage mechanism runs on an eccentric to drive the chain. If the head assembly encounters an obstacle or otherwise encounters a resistance in movement, the spring collapses and does not allow a forward movement of the head until the obstruction or resistance is removed.

12 Claims, 4 Drawing Sheets

BIN UNLOADING APPARATUS

FIELD OF THE INVENTION

The present invention relates to a conveyor apparatus and, more particularly, to a bin unloading conveyor apparatus for unloading bulk items such as, for example, sawdust, peat, grain, silage, municipal waste, dry chemicals, shredded tires, and any other ground bulk product.

An unloading conveyor system of the aforementioned type is disclosed in, for example, U.S. Pat. No. 3,212,652 wherein two conveyor systems are disposed in a bin, with one of the conveyor systems being disposed substantially centrally of the bin and extending in a longitudinal direction thereof, with the second conveyor system being disposed transversely of the first conveyor system and including two opposingly pitched worm conveyors respectively disposed on opposite sides of the first conveyor system.

U.S. Pat. No. 4,717,308 proposes a container unloading system wherein an elongated auger extends over the length of a forage box 10 just above the floor, with the auger being rotatably mounted at each end by rotatable shafts in front and rear of movable carriages which enable a transverse advancement of the auger back and forth across the floor of the box. A second conveyor is provided at a forward end of the forage box to receive materials discharged from the elongated auger. Separate and independent fluid motors provide the necessary drive for the unloading system.

Japanese patent publication 60-213631 proposes a storage shed arrangement wherein a longitudinally extending transport conveyor is provided and arranged below a floor surface so that granules can be smoothly fed thereto from a screw conveyor by way of reciprocably movable further conveyors which move along the floor of the shed to scrape off the granular particles from the bottom and feed the same to the transport conveyor.

French publication 2,611,681 also proposes a conveyor arrangement for transporting materials from a flat rectangular silo wherein the transport arrangement is arranged along a floor of the surface and is reciprocably movable so as to enable a discharge of the material from the container through discharge hoppers.

A disadvantage of the above-proposed constructions resides in the fact that, with materials which are not free flowing, materials tend to bridge or hang up over most of the conveyors, funnels or hoppers and the proposed conveyor constructions do not ensure the undercutting of the pile at the floor level so as to ensure, to a maximum extent, the effect of a live floor bin.

SUMMARY OF THE INVENTION

The aim underlying the present invention essentially resides in providing a bin unloading apparatus which includes a conveyor arrangement which avoids, by simple means, the shortcomings and disadvantages encountered in the prior art.

In accordance with advantageous features of the present invention, two cantilevered tapered screw conveyors or sweep screws and a single standard screw or exit screw are provided, with the sweep screws being adapted to draw material from walls of the bin toward the center thereof. The material is dropped into the exit screw that is mounted at a right angle to the tapered screw conveyors or sweep screws and extends the length of the bin.

In order to avoid an overloading of the exit screw or single standard screw, in accordance with further features of the present invention, the exit screw is covered by a shield to shield the exit screw so as to avoid the overloading thereof, thereby assuring that the quantity of material delivered to the exit screw is controlled by the two cantilevered tapered screw conveyors or sweep screws.

In accordance with further features of the present invention, the sweep screws are mounted on a beam that extends a length of the beam over the exit screw and under the shield. The beam supports the shield and serves as a track for the mounting of the sweep screws, with the sweep screws being supported in the center only on a head assembly and being solely driven under the material from one end of the bin to the other thereby effectively undercutting the bridges that are forming by the continual undercutting of the pile.

The traveling screw assembly formed by the two cantilevered tapered screw conveyors or sweep screws is driven from the center of the bin and is supported at the center so as to make installation and operation of the system extremely simple since there is no need to align the rails or modify the bin. Moreover, the dimensions of the apparatus, namely, the length and width, may easily be changed to suit a wide range of bins thereby making the apparatus of the present invention ideal for retrofitting existing bins where storage is to take place.

Advantageously, the head assembly of the present invention incorporates a standard double output shaft gear reducer mounted on the standard beam to create a simple traveling head, with heavy bearings being used to ride on the beam. The entire head assembly is advantageously protected by a shield, with a variable frequency drive being provided for allowing a variable speed and a high starting torque.

In order to achieve a reciprocating or back-and-forth motion of the head assembly, in accordance with the present invention, a chain drive is provided wherein a pin is attached to a roller chain drive and, as the pin follows the chain around the sprocket, the pin stops and then reverses direction thereby resulting in a simple and trouble-free drive arrangement.

In order to facilitate an attachment of the sweep screw to the head assembly, in accordance with the present invention, a flange arrangement is provided between the respective sweep screws and a main gear box which enables the sweep screws to be bolted to the main gear box without requiring a sliding onto a shaft. Consequently, the sweep screws may, in accordance with the present invention, be installed within fractions of an inch of outer walls of the bin.

In accordance with still further features of the present invention, a spring loaded arm is mounted on an eccentric pin which, in turn, is mounted on a drive shaft of the exit screw so as to enable the realization of an oscillating action at the speed of the exit screw. The spring loaded arm functions as a lever and cooperates with a ratchet bearing that turns the chain drive sprocket in one direction only. If the sweep screws or head assembly resist any forward motion, the spring collapses and does not permit the chain to advance until the resistance to the advancing movement is removed.

Additionally, in order to facilitate inspection and/or maintenance, a servicing arrangement is provided for permitting access from outside of the bin when the head assembly is in a home position. This arrangement allows the operator to inspect or service the head assembly each time the head assembly returns to a discharge end of the unloader.

The above and other objects, features and advantages of the present invention will become more apparent from the following description when taken in connection with the accompanying drawings, which show, for the purposes of illustration only, one embodiment in accordance with the present invention.

DETAILED DESCRIPTION

Figures 1, 2:
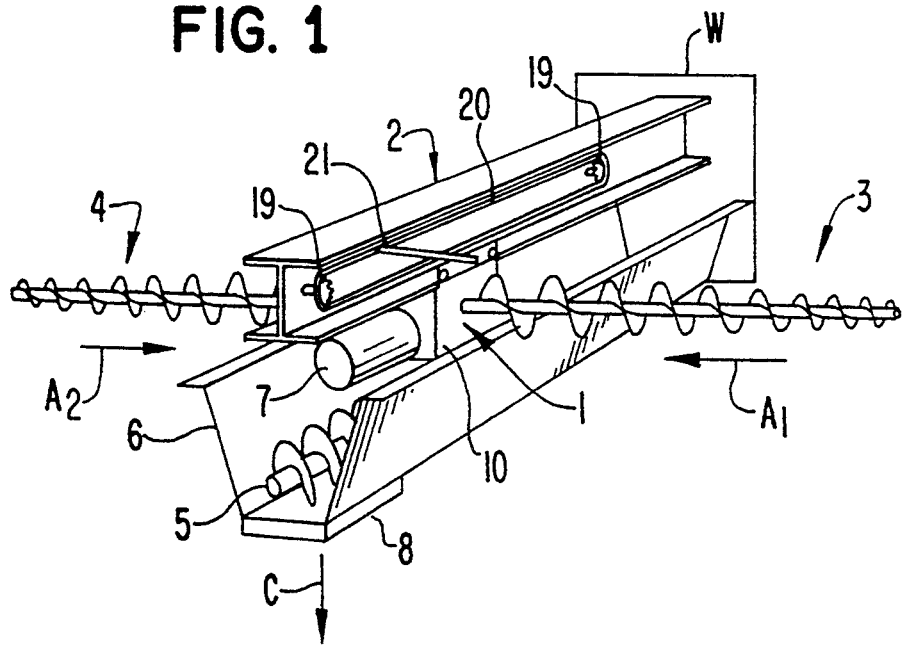
FIG. 1 is a perspective schematic view of a bin unloading apparatus construction in accordance with the present invention.
FIG. 2 is a transverse cross-sectional view of the apparatus of FIG. 1 located in a bin.

Referring now to the drawings wherein like reference numerals are used throughout the various views to designate like parts and, more particularly, to FIGS. 1 and 2, according to these figures, a bin unloader according to the present invention includes a head assembly generally designated by the reference numeral 1 having tapered screw conveyors or sweep screws generally designated by the reference numerals 3, 4 respectively disposed on opposite sides of the head assembly 1 in a cantilevered manner. The head assembly 1 is reciprocably displaceably mounted on a standard I-shaped beam 2 disposed centrally of and extending in a longitudinal direction of a bin generally designated by the reference character B. The beam is supported in a suitable manner between end walls W, only one of which is shown in FIG. 1, of the bin B. A single standard screw conveyor or exit screw 5 is disposed centrally of the bin B in a substantially U-shaped shield cover 6, with the shield cover 6 being provided for preventing any free flowing material from the screw conveyors 3, 4 from overloading the exit screw 5. In operation, the screw conveyors 3, 4 draw material from the walls of the bin B in the direction of the arrows $A_1$, $A_2$, with the drawn material being dropped into the exit screw 5 which is mounted at a right angle to the screw conveyor or sweep screws 3, 4 and which extends the length of the bin B. The material in the exit screw 5 is then transported out of the bin B and is discharged through a discharge opening or hopper 8. By virtue of the provision of the shield 6, and the disposition of the screw conveyors 3, 4, the quantity of material delivered to the exit screw 5 is controlled.

A further shield 9 is disposed above the beam 2 and serves to ensure an even distribution of the material above the screw conveyors 3, 4 to the exit screw 5 without overloading the same. Moreover, the shield 9 serves to protect the head assembly 1 and guide track, formed by the beam 2, from exposure to the materials accommodated in the bin B.

Figure 3:
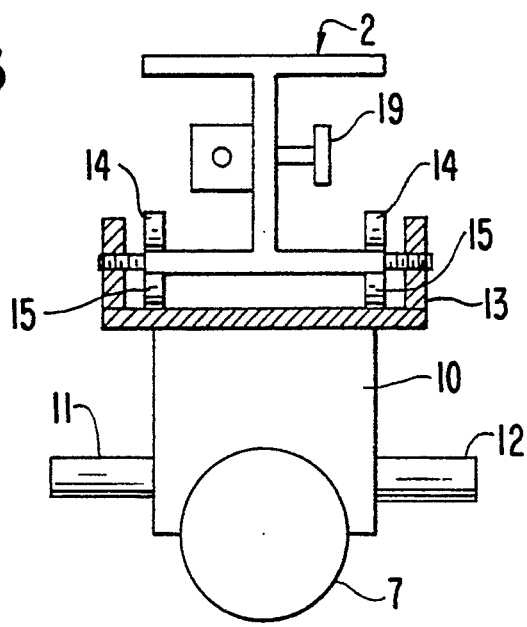
FIG. 3 is a schematic partial cross-sectional view of a head assembly of the bin unloading apparatus of FIG. 1.
Figure 4:
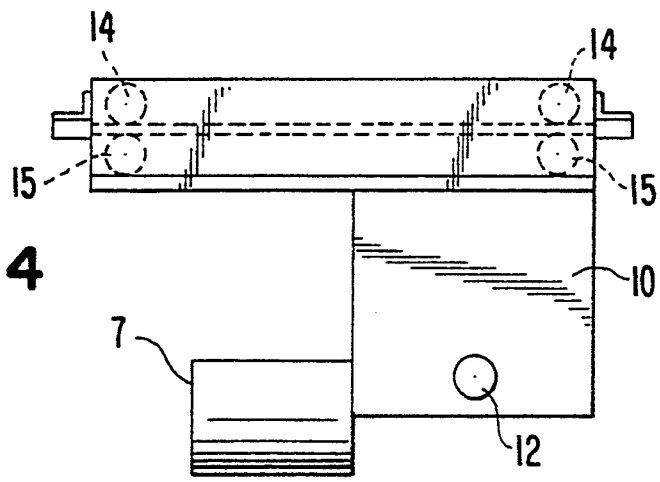
FIG. 4 is a schematic side view of the head assembly of FIG. 5.

As shown most clearly in FIGS. 3 and 4, the head assembly 1 includes a conventional double output shaft gear reducer 10, including output shafts 11, 12, supported on the beam 2 by a mounting bracket through a plurality of conventional cam follower bearing means supported on the mounting bracket 13.

Figure 5:
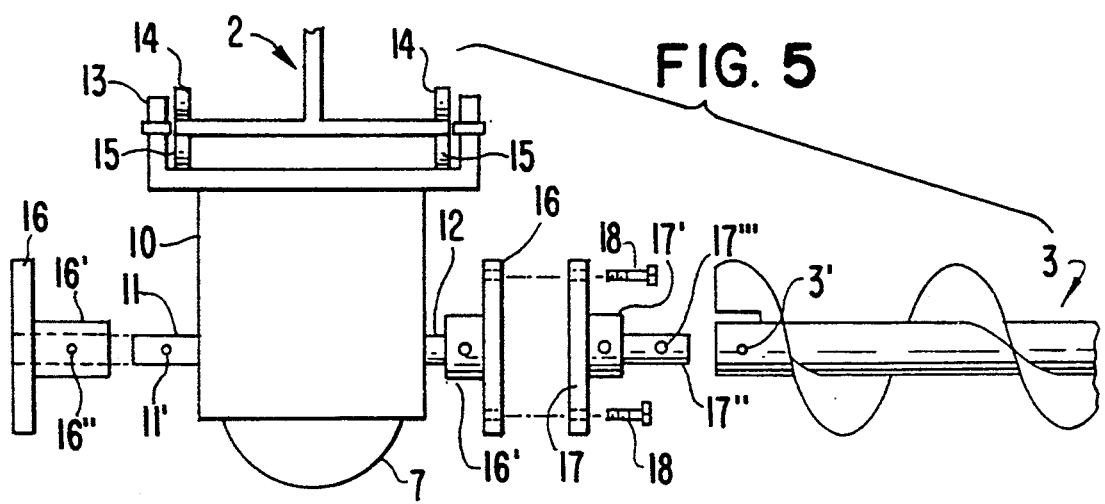
FIG. 5 is an exploded view of a connection between the head assembly and unloading means of the unloader of the present invention.

As shown most clearly in FIG. 5, the screw conveyors 3, 4 are connected to the gear reducer 10 by a flanged connection including a flange 16 mounted by way of a hub 16' to the respective output shafts 11, 12, and a further flange 17 connected to the respective screw conveyors 3, 4. The hub 16' may be connected to the respective shafts 11, 12 by a pin (not shown) inserted into aligned holes 16'' and 11' in the hub 16' and shaft 11 and corresponding aligned holes in the shaft 12 or by any other suitable conventional coupling arrangements which ensure a direct non-slip coupling between the shafts 11, 12 and the hubs 16, 16' of the flanges 16. The respective flanges 17 are secured to the flanges 16 by suitable fasteners such as, for example, screws 18. Each of the flanges 17, respectively associated with the screw conveyors 3, 4, are provided with a hub portion 17' having an extension 17'' adapted to be received in the respective screw conveyors 3, 4, with the screw conveyors 3, 4 being non-rotatably secured to the extensions 17'' by a pin (not shown) inserted into aligned holes 17''', 3' and a corresponding hole (not shown) in the screw conveyor 4. By virtue of the flanged connection of the screw conveyors 3, 4 to the gear reducer 10, it is possible to realize a simple disassembly of the screw conveyors 3, 4 from the head assembly 1 even when the screw conveyors 3, 4 are buried in the material accommodated in the bin B.

A motor 7 provides input power to the gear reducer 10, with the output shafts 11, 12, through suitable gear reduction, driving the screw conveyors 3, 4.

Figure 6:
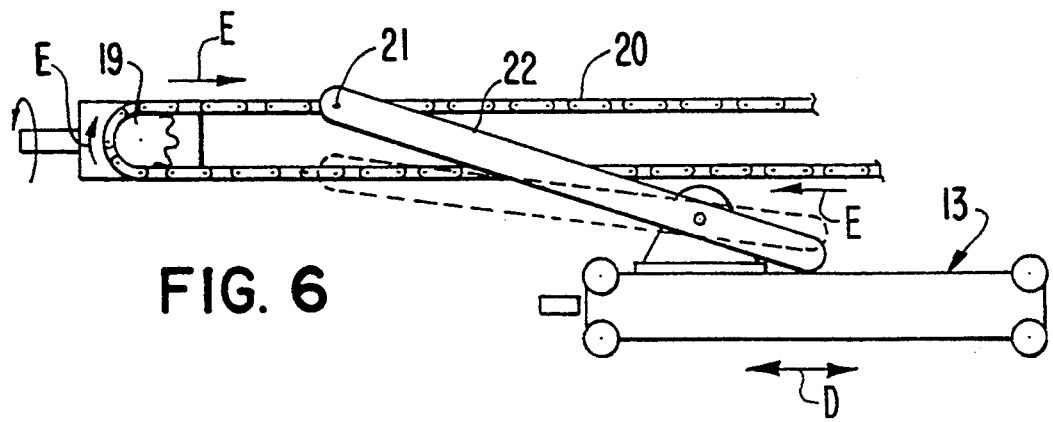
FIG. 6 is a schematic view of a drive arrangement for reciprocatingly moving the unloading means of the apparatus of FIG. 1.

As noted hereinabove, the head assembly 1 is mounted on the beam 2 for reciprocating movement in a direction of the double-headed arrow D and, for this purpose, as shown most clearly in FIG. 6, a chain drive system is provided which includes a pair of spaced rotatable chain sprockets 19 mounted on the beam 2, with a roller chain 20 being disposed between the two chain sprockets 19. The motor 7 for driving the screw conveyors 3, 4 is mounted on the head assembly 1 and provides a variable frequency drive for the screw conveyors 3, 4 thereby enabling not only a variable speed but also a high starting torque.

In order to achieve the reciprocating motion of the head assembly 1 and therewith the screw conveyors 3, 4 in the direction of the double-headed arrow D, a pin 21 is attached to the roller chain 20 and is adapted to follow the roller chain 20 around the respective sprockets 19. The pin 21 is pivotally connected by a link 22 to the mounting bracket 13 for the head assembly 1. As apparent from FIG. 6, as the roller chain 20 moves in the direction of the arrows E, the head assembly 1 will be displaced toward the right of the figure and, after the pin 21 passes the sprocket 19 at the far end of the bin B, the pin 21 is disposed on the return run of the roller chain 20, as shown in phantom line in FIG. 6, thereby resulting in the head assembly being displaced toward the opposite or discharge side of the bin B until arriving at the home position shown in FIG. 7. The pin 21 then passes around the sprocket 19 at the left of FIG. 6 and the head assembly 1 is displaced to the far end of the bin B. The sprocket 19 near the far end of the bin B and the link 22 are positioned and dimensioned so as to enable the screw conveyors 3, 4 to traverse an entire length of the bin B from the discharge end to the far end thereof.

Figure 7:
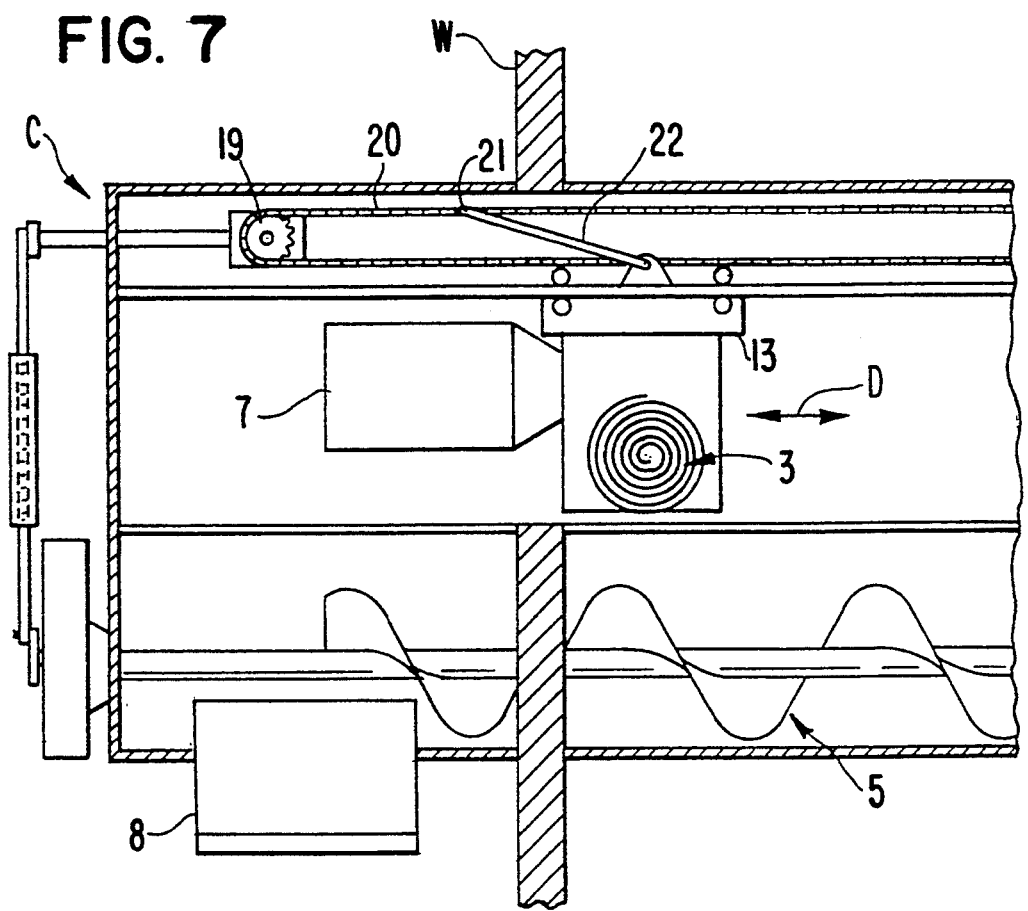
FIG. 7 is a schematic view of an unloading means of FIG. 6 in a home position.

To facilitate servicing of the head assembly 1, as shown in FIG. 7, the unloader extends beyond one end wall W of a bin B so that when the head assembly is in the home position of FIG. 7, access to the head assembly 1 and/or screw conveyors 3, 4 is possible by removal of a cover generally designated by the reference character C. Such access permits an operator to inspect and/or service the head assembly each time the head assembly returns to the home position, which home position is preferably located at the discharge end of the bin B.

Figure 8:
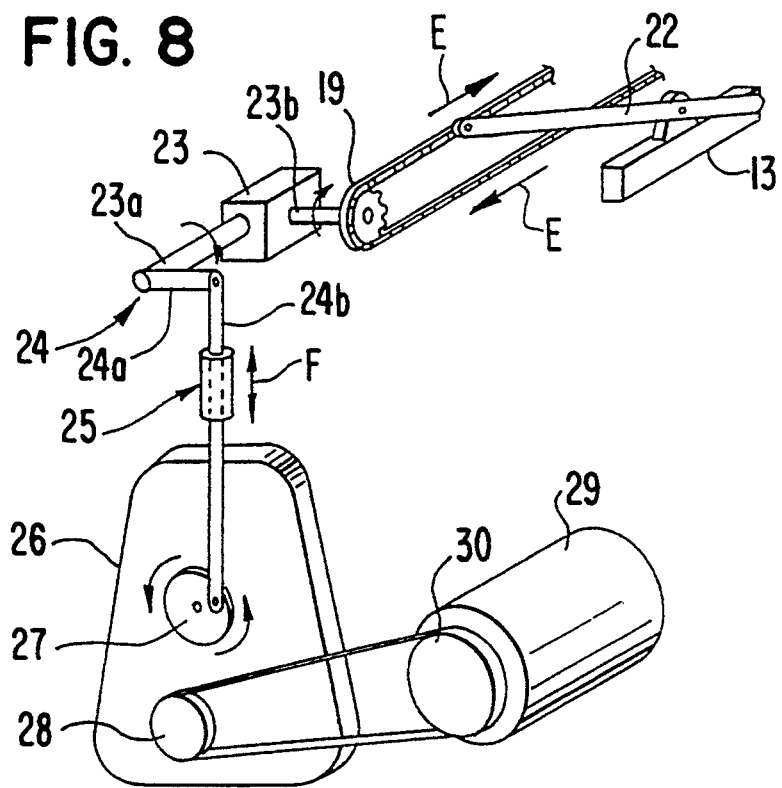
FIG. 8 is a perspective schematic view of a movement control arrangement for a portion of an unloading means of the apparatus of FIG. 1.
Figure 9:
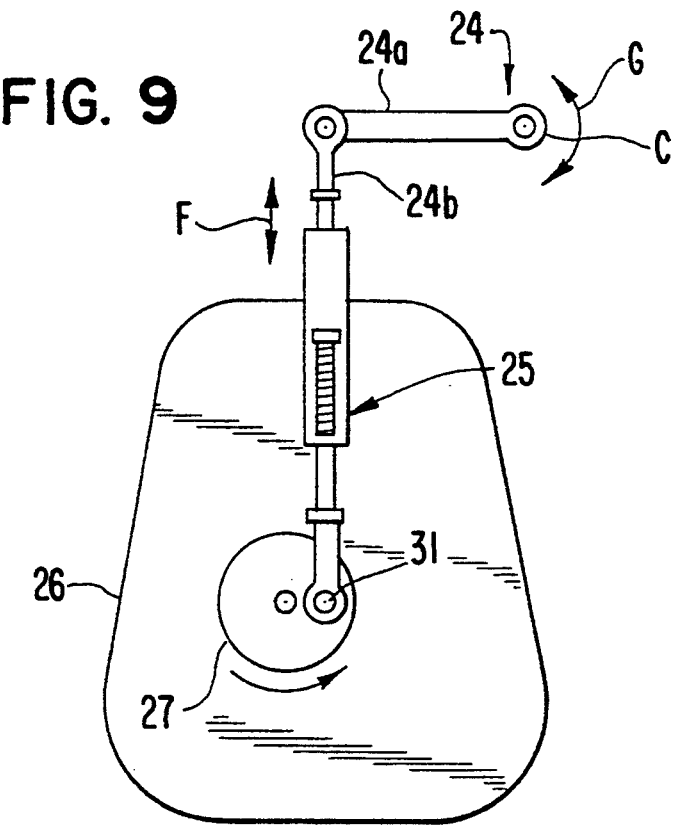
FIG. 9 is a plan view of the movement control arrangement of FIG. 8.

As shown in FIGS. 8 and 9, to drive the roller chain 20, one of the sprockets 19 is connected to a conventional right angle gear box 23 having a 1:1 gear ratio, with the gear box 23 having an input shaft 23a and output shaft 23b connected to the sprocket 19. The input shaft 23a is connected to a drive linkage generally designated by the reference numeral 24 including a conventional pawl and ratchet one-way clutch C, a link member 24a, and a further link member 24b, with the pawl and ratchet one-way clutch C being interposed between the link member 24a and the input shaft 23a of the gear box 23. One end of the link member 24b is connected to an end of the link member 24a opposite the clutch C, with an opposite end of the link member 24b being connected to an eccentric 31 mounted on a drive shaft 27 of the exit screw 5. The drive shaft 27 of the exit screw 5 is driven through suitable gearing in a gear box 26 by a drive motor 29, drive belt 30 and input pulley 28 for the gear box 26. By virtue of the one-way clutch drive arrangement, it is possible to achieve an oscillating action in the direction of the arrows F and G at the speed of the exit screw 5. The link mechanism 24 works as a lever and ratchet to drive the sprocket 19 only in one direction.

In order to minimize damage to the head assembly 1 and/or the screw conveyors 3, 4, as shown in FIGS. 8 and 9, the link member 24b includes a spring assembly generally designated by the reference numeral 25 interposed between the eccentric pin 31 and the link member 24a. The spring assembly 25 has a spring characteristic such that the chain roller 20 is driven through the link mechanism 24, gear box 23 and sprocket 19 under normal operating conditions determined by the material being unloaded. However, if the head assembly 1 and/or the screw conveyors 3, 4 encounter an obstacle in the material or if, for some other reason, the drive experiences a resistance in excess of the spring force of the spring assembly 25, the spring in the spring assembly 25 collapses and the drive of the head assembly is interrupted until such time as the obstacle or resistance is removed. The spring force of the spring assembly 25 is naturally determined by the nature of the material being handled.

By virtue of the disposition of the screw conveyors 3, 4 and cantilever arrangement of such screw conveyors on a centrally disposed head assembly, it is possible to undercut the pile at the floor level as much as possible thereby effectively producing the effect of a live floor bin.

Moreover, the supporting of the screw conveyors 3, 4 only on the head assembly 1 and slowly driving the same under the material from one end of the bin B to another effectively undercuts the bridges that are forming by continually undercutting the pile.

By driving the head assembly 1 and screw conveyors 3, 4 from the center of the bin and only supporting the screw conveyors 3, 4 at the center of the bin B makes the installation and operation of the system very simple. There is no need to align rails or modify the bin and the dimensions of the entire assembly, for example, length and width, are easily changed to suit a wide range of bins. Thus, an apparatus such as contemplated by the present invention is ideally suited for retrofitting into existing bins where storage is to take place.

Furthermore, the unloading apparatus of the present invention is readily available for not only the handling of sawdust but also peat, grains, silage, municipal waste, dry chemicals, shredded tires and any other ground bulk products, with the only criteria being the particle size and bin size for determining the size of the unit to achieve optimum results.

While I have shown and described only one embodiment in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. A bin unloading apparatus comprising:
a substantially rectangular bin for accommodating a material to be unloaded;
a discharge conveyor means provided at a floor level of the bin for receiving and discharging material from the bin;
feed conveyor means for feeding the material to the discharge conveyor means including a head assembly, a pair of screw conveyor means for feeding material from respective sides of said bin toward a center thereof, and a single drive means mounted on said head assembly for driving said pair of screw conveyor means; and
means disposed substantially centrally of the bin and extending in a longitudinal direction thereof for solely supporting said head assembly, said pair of screw conveyor means and said drive means in said bin,
wherein said pair of screw conveyor means are respectively mounted on opposite sides of said head assembly in a cantilevered manner, and
wherein said head assembly includes a reduction gear interposed between an output of said drive means and said pair of screw conveyor means.

2. A bin unloading apparatus according to claim 1, wherein means are provided between said head assembly and said discharge conveyor means for preventing an overloading of said discharge conveyor means.

3. A bin unloading apparatus according to claim 2, wherein means are provided for shielding said head assembly from material accumulated in the bin and for ensuring a uniform distribution of the material from the pair of screw conveyor means to said discharge conveyor means.

4. A bin unloading apparatus comprising:
a substantially rectangular bin for accommodating a material to be unloaded;
a discharge conveyor means provided at a floor level of the bin for receiving and discharging material from the bin;
feed conveyor means for feeding the material to the discharge conveyor means including a head assembly, a pair of screw conveyor means for feeding material from respective sides of said bin toward a center thereof, and a drive means mounted on said head assembly for driving said pair of screw conveyor means;
means disposed substantially centrally of the bin and extending in a longitudinal direction thereof for supporting said feed conveyor means in said bin;
means for reciprocatingly moving said feed conveyor means along a length of said bin comprising a drive chain including a drive pin, a link means connected to said drive pin and said head assembly, and means for driving said drive chain; and
means for interrupting a movement of said head assembly upon at least one of said head assembly and said screw conveyor means encountering a predetermined resistance.

5. A bin unloading apparatus according to claim 4, wherein said means for driving said drive chain includes a drive sprocket, and means connected to said drive sprocket for driving the drive sprocket in only one direction.

6. A bin unloading apparatus comprising:
a substantially rectangular bin for accommodating material to be unloaded;
a discharge conveyor means provided at a floor level of the bin for receiving and discharging material from the bin;
feed conveyor means for feeding the material to the discharge conveyor means including a head assembly, a pair of screw conveyor means for feeding material from respective sides of said bin toward a center thereof, and a drive means mounted on said head assembly for driving said pair of screw conveyor means:
means disposed substantially centrally of the bin and extending in a longitudinal direction thereof for supporting said feed conveyor means in said bin;
means for reciprocatingly moving said feed conveyor means along a length of said bin comprising a drive chain including a drive pin, a link means connected to said drive pin and said head assembly, and means for driving said drive chain; and
means for interrupting said head assembly upon at least one of said head assembly of said screw conveyor means encountering a predetermined resistance,
wherein said means for driving said drive chain includes a drive sprocket, and means connected to said drive sprocket for driving the drive sprocket only in one direction, and
wherein said means for driving the drive sprocket includes a drive linkage connected to an output shaft of said discharge conveyor means, and a one-way clutch means for driving said drive sprocket in said one direction.

7. A bin unloading apparatus according to claim 6, wherein a gear box is interposed between said drive sprocket and said drive linkage, said gear box including an output shaft connected to said drive sprocket and an input shaft connected to said one-way clutch means.

8. A bin unloading apparatus according to claim 7, wherein said means for interrupting includes a spring assembly provided in said drive linkage between said output shaft and said one-way clutch means, said spring assembly having a predetermined spring force so as to enable said drive linkage to drive said drive chain during a normal operation and to interrupt the drive upon at least one of the head assembly and the feed conveyor means encountering a resistance greater than said spring force.

9. A bin unloading apparatus according to claim 8, wherein said pair of screw conveyor means are respectively mounted on opposite sides of said head assembly in a cantilevered manner, and wherein said head assembly includes a reduction gear interposed between an output of said drive means and said pair of screw conveyor means.

10. A bin unloading apparatus according to claim 9, wherein means are provided between said head assembly and said discharge conveyor means for preventing an overloading of said discharge conveyor means.

11. A bin unloading apparatus according to claim 10, wherein means are provided for shielding said head assembly from material accumulated in the bin and for ensuring a uniform distribution of material from said pair of screw conveyor means to said discharge conveyor means.

12. A bin unloading apparatus comprising:
a substantially rectangular bin for accommodating a material to be unloaded;
a discharge conveyor means provided at a floor level of the bin for receiving and discharging material from the bin;
feed conveyor means for feeding the material to the discharge conveyor means including a head assembly, a pair of screw conveyor means for feeding material from respective sides of said bin toward a center thereof, and a means mounted on said head assembly for driving said pair of screw conveyor means; and
means disposed substantially centrally of the bin and extending in a longitudinal direction thereof for solely supporting said head assembly said pair of screw conveyor means and said drive means in said bin;
wherein said means for solely supporting includes means for supporting said pair of screw conveyors on respective sides of said head assembly in a cantilevered manner.

* * * * *